Figure 1:
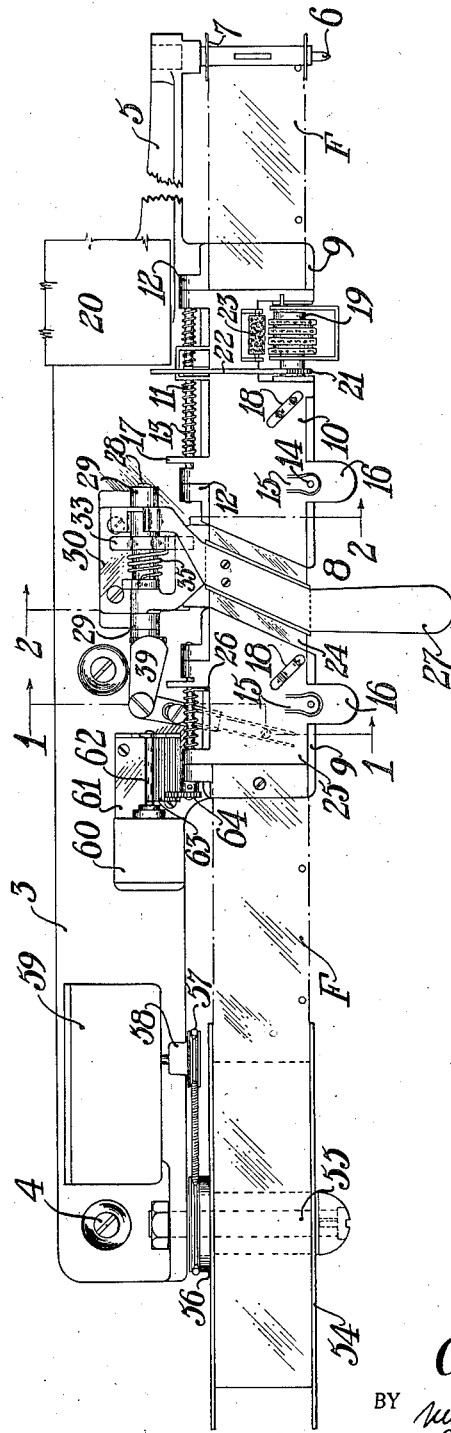

May 11, 1937.  C. J. HUGHEY  2,080,046
FILM SPLICING APPARATUS
Filed Nov. 29, 1935  3 Sheets-Sheet 1

INVENTOR.
Carter J. Hughey,
BY
ATTORNEYS.

May 11, 1937.   C. J. HUGHEY   2,080,046
FILM SPLICING APPARATUS
Filed Nov. 29, 1935   3 Sheets-Sheet 2

INVENTOR.
Carter J. Hughey,
BY
ATTORNEYS.

May 11, 1937.   C. J. HUGHEY   2,080,046
FILM SPLICING APPARATUS
Filed Nov. 29, 1935   3 Sheets-Sheet 3

INVENTOR.
Carter J. Hughey,
BY
ATTORNEYS.

Patented May 11, 1937

2,080,046

UNITED STATES PATENT OFFICE 2,080,046

FILM SPLICING APPARATUS

Carter J. Hughey, Rochester, N. Y., assignor, by mesne assignments, to Eastman Kodak Company, Jersey City, N. J., a corporation of New Jersey Application November 29, 1935, Serial No. 51,983

17 Claims. (Cl. 154—42)

This invention relates to photography and particularly to a film splicing apparatus which is especially adapted for rapidly splicing a number of short lengths of film into one continuous strip in total darkness prior to the processing of said film.

In answer to the popular demand for a small camera which uses a small film and is economical for the amateur to operate, a camera has been developed which takes a 28 x 40 cm. picture with eight exposures to the roll. Inasmuch as a finished print 28 x 40 cm. would be too small to be of any value as to detail, the manufacturer of this film operates a processing station for this size film where the film is automatically processed and the individual pictures are enlarged so that the finished prints are 2¼ x 3¼ inches in size.

The futility of attempting to run the individual eight exposure rolls of this 28 x 40 cm. film through a continuous automatic processing and enlarging machine can be appreciated by one skilled in the art. Therefore, in order to satisfactorily process these small rolls of film, a great number of these individual rolls are spliced together to make one long continuous strip which is subsequently fed through the processing machine. And since these exposed films are to be spliced together prior to processing, the splicing operation must be carried out in total darkness to avoid any possibility of fogging the film.

Therefore, one object of my invention is to provide a splicer by means of which an operator can splice from 15 to 20 individual rolls of film together per minute in total darkness. Another object of my invention is to provide a splicer on which the individual rolls of film are mounted on a suitable spindle, and pulled across the splicing tables by a motor driven take-up reel which is adapted to hold a long strip of spliced film. Still another object is to provide a splicer which is provided with means for stamping each individual film and its container with a duplicate number so that the separate films can be properly distributed after processing and enlarging. Another object is to provide a splicer wherein the motor for driving the take-up reel is automatically started and stopped by raising and lowering the film holding platen of one of the film tables.

The preferred form of my device consists of two film holding tables, one stationary and the other slidable to and from abutting position therewith, on which the ends of the films to be spliced are positioned in suitable guides. One end of the film is held on the stationary table by a spring pressed platen which has a stamp mounted thereon for stamping a number on the film strip in its holding position and stamping the same number on the container for said film strip when it is in its releasing position with respect to said film table.

The slidable film table is normally spring pressed away from the stationary table so that the cutting knife can pass between the two and simultaneously trim the two ends of the film on said tables. The knife is suitably connected with said slidable table so that as it is rotated rearwardly of its vertical position it automatically slides said movable table into abutting position with the stationary table and abuts the two trimmed ends of the film for splicing. After a strip of fast setting adhesive material has been placed over the abutted ends of the film strips, a spring pressed film holding platen on the slidable table is raised to release the film thereon. This step causes a closing of a switch for the driving motor of the take-up reel and the film is advanced across the two splicing tables by being taken-up on the take-up reel until the free end of the film is properly positioned on the movable table so that it can be spliced to the next individual roll of film.

Figure 2:
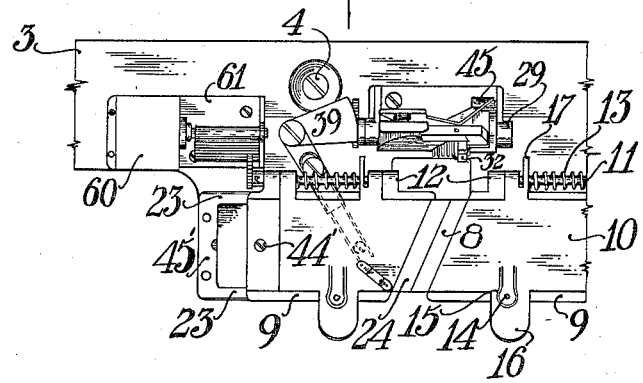
Figure 3:
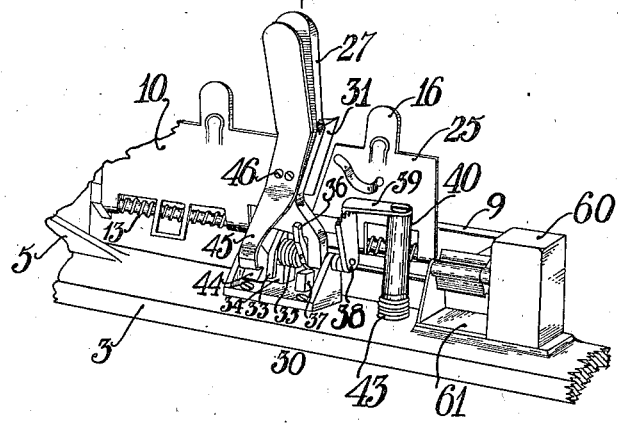
Figure 4:
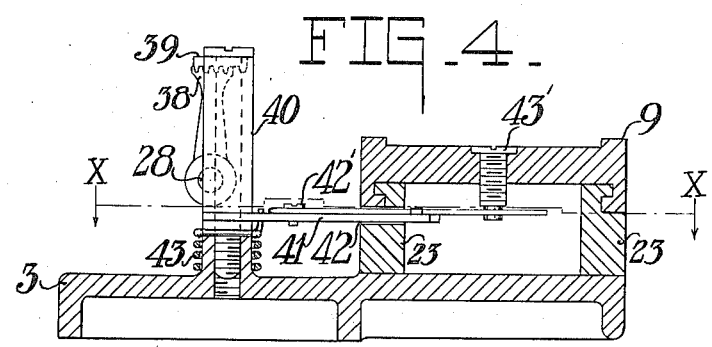
Figure 5:
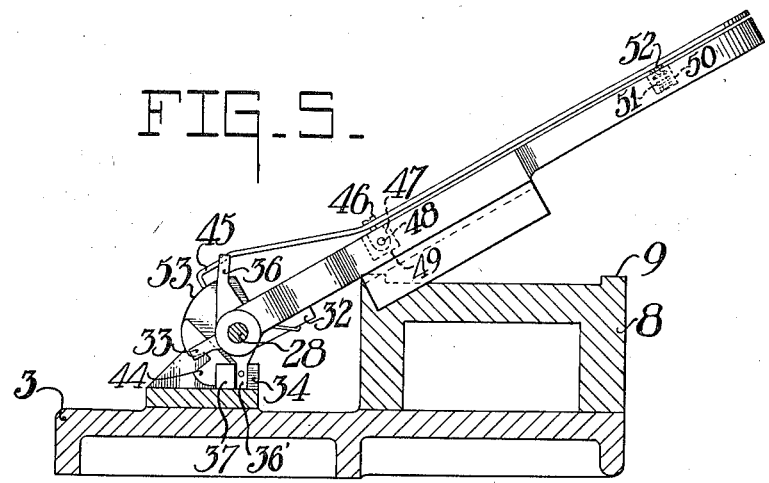
Figure 6:
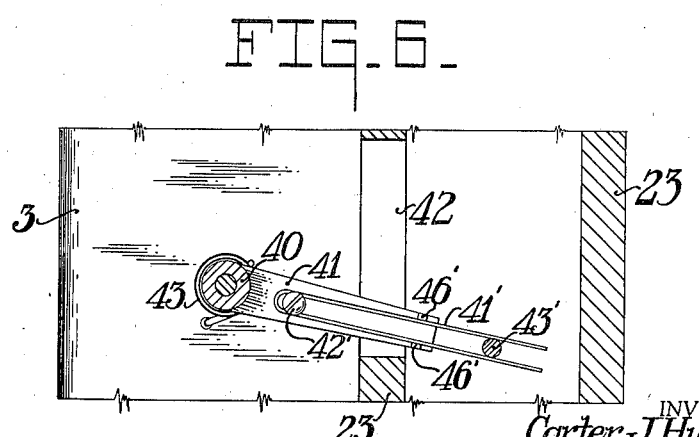

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings in which, Fig. 1 is a top plan view of the splicing apparatus showing the knife in cutting position, Fig. 2 is a top plan view of a portion of said apparatus showing the knife in its rearward position for abutting the two film holding tables, Fig. 3 is a rear perspective of the apparatus showing the knife in its rearward position, Fig. 4 is an end section taken on line 1—1 of Fig. 1, Fig. 5 is an end section taken on line 2—2 of Fig. 1, and, Fig. 6 is a longitudinal section taken on line x—x of Fig. 4.

Like reference characters refer to corresponding parts in the several figures.

The apparatus comprises a base plate 3 which is mounted on a table, bench, or any other support by means of screws 4. Integral with one end of the base 3 is an arm 5 on which is mounted a spindle 6. One of the small individual rolls of film 7 that is to be spliced into a long strip is mounted on the spindle 6 to rotate freely, and the film F is pulled therefrom across the stationary table 8 which is mounted on the base 3. The stationary table 8 is provided along its edges with rails 9 so that a guide for the film is provided thereon.

The film strip F is held on the stationary table by means of a platen 10 which is rotatably mounted on a bar 11 positioned in bearings 12 on the edge of the table. This platen 10 is normally spring pressed to its raised position by means of spring 13, but is adapted to be held in the film gripping position on the table by means of the frictional engagement between a stud 14 on the table 8 and a punched out spring catch 15 in the grip 16 of the platen. The rear edge of the platen is provided with a finger 17 which is adapted to contact the rear wall of the table 8 as the platen is raised, and which acts as a stop to prevent the platen from swinging past the vertical position under the action of the spring 13. The film to be spliced is properly positioned on the film table by virtue of the engagement between definitely spaced perforations along the border of the film strip and pins on the platen 10 which are pressed into engagement therewith by means of spring clips 18.

For identifying the individual rolls of film and their respective shipping containers, a stamping mechanism 19 is rotatably mounted in a cutaway portion of the platen 10 so that a number is stamped on the margin of the film strip as the platen is lowered. The envelope or container in which the film was received is placed in a box 20 which is mounted on the base 3, and is held against a window in the front thereof by a spring pressing means not shown. A gear 21 is fixed to the stamp 19, and is engaged by a rack 22 fastened to the bar 11. As the platen 10 is raised, the engagement between the rack 22 and the gear 21 causes a given rotation of the stamp so that in the vertical position of the platen the same number that was stamped on the film F is also stamped on its respective container which has been placed in the box 20. The stamp is adapted to pass over an inking pad 23 between its two positions, and the numbering thereof is adapted to be changed at each downward stroke of the platen so that each successive film stop is given a different number.

The base 3 is provided with ways 23 on which is mounted a movable table 24, adapted to be slid to and from abutting position with said stationary table 8. This movable table 24 is in alignment with the stationary table and is provided with similar rails along its edge identical with rails 9 on table 8, between which the other end of the film to be spliced is positioned. A film holding platen 25 is mounted adjacent this movable table 24 on a bar 26, and is constructed and operated the same as the above mentioned film holding platen 10. The shearing edges of the film holding tables 8 and 24 are on the diagonal so that the film splice made by abutting the trimmed ends of the film strips thereon and applying a strip of fast setting adhesive material thereto is a diagonal abutting form of splice. A knife 27 is rotatably mounted in bearings 29 of the bracket 30 positioned on the base. The movable table 24 is normally spring pressed away from the stationary table 8 a given distance so that the knife is adapted to pass between the two and simultaneously trim the ends of the film thereon. The actual shearing edges of the knife 27 consist of a concave blade member 31 which is fastened to the knife 27 by means of screws so that it can be easily removed for the purpose of sharpening.

The knife 27 has three distinct positions depending upon its function. First, there is the intermediate or inoperative position which is attained when the knife is normally held in its vertical position between the spring pressed actuating arms 32 and 36. Secondly, the knife 27 is rotated to the cutting position by swinging it forwardly of its vertical position against the spring pressed actuating arm 32, said arm normally forcing said knife away from the cutting position. And the third or splicing position of the knife is accomplished by rotating it rearwardly of its intermediate position against the action of the spring pressed actuating arm 36, rotation of the knife to this position causing the movable table 24 to be slid into abutting position with the stationary table 8 by means of an interconnected mechanism which will be described fully below.

The actuating arm 32 which is normally forced to a vertical position by the spring 35 is rotatably mounted on the shaft 28 and is adapted to contact the forward side of the knife 27 as shown most clearly in Fig. 4, when said knife is swung toward its cutting position. Said actuating arm 32 has a projection 33 which is adapted to contact a suitable stop member 34 on said base when the knife is raised to its vertical position, said stop preventing the actuating arm 32 from forcing said knife 27 past its vertical position. The actuating arm 36 pinned to the shaft 28 is normally spring pressed to its vertical position by means of spring 35, and is prevented from rotating forwardly of this position by virtue of the engagement of a projection 36' thereon with another stop 37 on the base 3. Therefore, as the knife 27 is rotated rearwardly of its vertical or intermediate position to the splicing position, its rear side contacts the spring pressed actuating arm 36 and causes a rotation of the shaft 28 due to the pinned connection between said arm 36 and said shaft 28. From the above description it can be understood that the two actuating arms 32 and 36 are normally forced toward and prevented from swinging past their vertical position by virtue of the combined action of the spring 35 and the stops 34 and 37, and in their normal positions they are so spread apart that the knife 27 is adapted to be held in a vertical position between the two.

A gear segment 38 is mounted on one end of the shaft 28 to be rotated thereby, and is adapted to be engaged by a gear member 39 mounted atop the turning post 40 which in turn is rotatably mounted on the base 3. A bar member 41 is mounted on said turning post to be rotated thereby and has a U shaped spring member 41' fixed thereto by means of a bolt 42'. The bar member and its associated spring member 41' passes through an elongated slot 42 in the way 23 of the movable table 24 so that a stud 43' extending through said table 24 is engaged by said U shaped member as shown in Fig. 6. Therefore, as the bar member 41 and its associated U shaped spring member are rotated by the turning post, the motion is adapted to be translated to a sliding movement of the table 24, the stud thereon sliding within the slot of the U shaped spring member 41.

The resilient connection between the turning post and the stud 43' on the table is used because a resiliency at this point tends to properly hold the slidable table in tight abutting position with the stationary table 8, or in the spaced position of the tables it tends to properly hold a stud 44' in the movable table against end wall 45' of the ways 23 thereby properly holding the tables in a given spaced relation for the reception of the knife 27 therebetween for trimming the film ends. In order to increase the resilient strength of the U shaped spring member and to overcome deformation thereof, lugs 46' are mounted on the bar member 41 for the purpose of confining the two spring fingers thereof. Therefore, a rotation of the knife 27 to its splicing position causes a rotation of the actuating arm 36 and subsequently a rotation of the gear segment 38 which is translated through the gear member 39 to the turning post 40 and its bar member 41 to slide the movable table into abutting position with the stationary table. The movable table 24 is normally spring pressed to its cutting position by the action of the spring 35 which forces the knife to its intermediate position but in order to diminish the work required of this spring, another spring 43 is adapted to act on the turning post 40 to help the spring 35 return the movable table to its cutting position.

Therefore, in order to positively hold the knife in its splicing position against the combined action of the springs 35 and 43, a catch member 44 is mounted on the base 3 and is adapted to be releasably engaged by a hooked end gripping member 45 which is mounted atop the knife 27. The gripping member 45 is pivotally mounted atop the knife by means of a pair of screws 46 and is fastened to a U shaped angle bracket 47 which is adapted to rock on a pin 48 positioned in a suitable recess 49 in the handle of the knife. The end of the handle is provided with a recess 50 in which is seated a coiled spring 51 engaging pin 52 on the handle so that said gripping member is constantly forced away from the knife 27 at the handle thereof. For overcoming this spring pressing means 51, a cam 53 is mounted on the base 3 adjacent the catch member 44 and it is engaged by the hooked end of the gripping member 45 in the intermediate and cutting positions of said knife. As the knife 27 is rotated to its splicing position the hooked end of the gripping member is spring pressed into engagement with the catch member 44 as the gripping member pivots about the pin 47 under the action of the spring 54. In order to release the gripping member 45 from engagement with the catch 44, the end of the gripping member is pressed to compress the spring 51 and the knife is rotated forwardly by the springs 35 and 43 as described, the hooked end of the gripping member riding on the face of the cam 53.

On the end of the base 3, opposite to the end on which the spindle 6 is mounted, there is fixed a large take-up reel 54 which is in alignment with said film tables 24 and 8 and said supply spindle 6 for the purpose of receiving a long length of the spliced film strip therefrom. The spindle 55 on which said take-up reel is mounted is provided with a pulley 56 which is adapted to be driven by a belt 57 from the pulley 58 driven by an electric motor 59 mounted on the base. The motor 59 is controlled by means of a rotary switch 60 in which is mounted in a suitable bracket 61 on the base adjacent the movable film table 24. The rotary switch 60 is provided with an operating shaft 62 to which is pinned an elongated gear segment 63. Said gear segment 63 is engaged by a gear member 64 which is pinned to shaft 26 on which the film holding platen 25 is mounted so that the shaft 26 and subsequently the gear member 64 is rotated as said platen 25 is swung to and from its film gripping position relative to the movable table 24. Therefore, as the platen 25 on the movable table is raised to release the film thereon, the gear member 64 is rotated and subsequently rotates the elongated gear segment 63 causing a rotation of the operating shaft 62 on the rotary switch 60 and a closing of said switch to start the motor driving the take-up reel, for taking up the spliced film from said tables. In an opposite sense therefore, as the film platen 25 is lowered to its film gripping position, the motor for the take-up reel is stopped by means of the engaging mechanism between the switch and platen 25, this condition being maintained while film strips on the two film holding tables are being trimmed and spliced.

The engagement between the gear segment 63 and the gear member 64 is maintained at all times and in all positions of the movable table 24. As the movable table 24 is slid to and from abutting position with the stationary table 8, the gear member 64 by virtue of its mounting must necessarily travel the same path longitudinally of the base. Therefore, to insure the engagement of the gear segment 63 with the gear member 64 in all of its positions, said gear segment 63 is made a length slightly greater than the distance traveled by the movable table 24 between its cutting and splicing positions relative to said stationary table 8. Then as the gear member 63 is moved back and forth with the movable table 24, the engagement of the two gears 63 and 64 and switch 60 for the electric motor is adapted to be actuated by raising and lowering the film holding platen 25 regardless of whether the movable film table 24 is in splicing or cutting position relative to said stationary table 8.

The operation of said splicing apparatus is as follows:

One end of the initial film F to be spliced is placed on said movable film holding table 24 and held there by means of the film holding platen 25. A small roll of film that is to be spliced thereto is placed on the spindle 6 and pulled across the stationary film holding table 8 until it is correctly positioned thereon with one end overlying the shearing edge of said table 8. The envelope in which the film was shipped is placed in the box 20 and is spring pressed toward a window in the front thereof. Then as the film holding platen 10 is swung down into film gripping position relative to said table, the stamp 19 is adapted to strike the film and put an identifying number on the border thereof. The knife 27 is then rotated between the two tables, which are normally spring pressed apart, and the ends of the two films are simultaneously trimmed on the diagonal. The knife is then released and due to a spring pressing means 35 acting on the actuating arm 32 it is raised to its intermediate or vertical position. Then by forcing the knife rearwardly against the spring pressed actuating arm 36 which is pinned to the shaft 28 the movable table 24 is slid into abutting position with the stationary table 8 by virtue of the engaging mechanism connecting the two so that the two previously trimmed film strips thereon are in abutment with each other. Inasmuch as the movable table 24 is normally spring pressed from said stationary table by means of a spring 43 acting on the turning post 40, it is provided that the knife will be releasably held in its splicing position by having a hooked end gripping member thereon for engaging a catch member 44 on said base.

The abutting ends of the film strips are spliced together by placing a strip of suitable fast setting adhesive material, over the joint. Inasmuch as the splices of the finished film strip are only temporary and are not subjected to any appreciable strain, no time is required for this adhesive strip to set or dry. After this splice is made, the platen 10 on the stationary table is released from its gripping position and is allowed to be raised by the spring 13 to its vertical position. During the rotation of said platen 10 from its film gripping position to its vertical position, the stamp is adapted to be rotated by means of the engagement between the rack 22 and the pinion 21 so that the same number which was stamped on the border of the film strip is stamped on its respective envelope through the window in the box 20. Therefore, since the envelope has the sender's name and address contained thereon, this system of numbering insures the proper distribution of the several films after they are cut up into the individual strips following the processing thereof in the one long continuous strip. After the film holding platen 10 has been raised to its releasing position, then the film holding platen 25 on the movable table 24 is raised to release the film on said table. Upon the raising of platen 25 the switch 60 is closed by virtue of the engagement between the gear member 64 and the elongated gear segment 63, and the electric motor 59 is started causing a rotation of the take-up reel 54. The rotation of the take-up reel is fairly slow and it pulls the spliced film strips from the supply spool on the spindle 6 and across the tables until the end of the film leaving said spool is properly positioned on the movable table 24 when it is stopped by lowering the film holding platen 25 for gripping this new end on the movable film holding table 24. Then another roll of film is placed on the spindle 6 and the operation is repeated as described. As the knife 27 is released from its splicing position, prior to the next trimming operation, it is spring pressed forward to its intermediate position and the movable table 24 is spring pressed away from the stationary table 8 by the combined action of the spring 35 acting on the actuating finger 36 and the spring 43 acting on the turning post 40. Therefore, before the knife can be brought into cutting position the movable table 24 is spring pressed away from the stationary table 8 so that the knife can pass between the two.

This splicing apparatus provides a simple and efficient means for rapidly splicing a number of individual films of short lengths into a single film of long length so that it can be run through a continuous processing machine. The apparatus is semiautomatic in its operation so that it can be operated in a dark room by an operator, and although the type of splices made thereon are of a temporary nature, they are satisfactory for the purpose for which they are designed. It would be perfectly possible to adapt this machine to making splices of a permanent nature without deviating from the spirit of invention contained therein, but due to the sacrifice of speed in operation that would be required for such a change we have not considered this feature herein.

Although I have shown and described certain specific embodiments of my invention, I am fully aware that many modifications thereof are possible. My invention, therefore, is not to be restricted except insofar as is necessitated by the prior art and by the spirit of the appended claims.

Having thus described my invention, what I declare is new and desire to secure by Letters Patent of the United States is:

1. A film splicing apparatus comprising a base, a spindle mounted on said base for receiving the rolls of film to be spliced, a stationary film holding table and a movable film holding table mounted on said base in alignment with said spindle said movable table being slidable relative to said stationary table for abutment therewith but normally spring pressed therefrom, a take-up reel mounted on said base in alignment with said film holding tables and said spindle, an electric motor for driving said take-up reel, a switch mounted on said base for controlling said motor, a knife pivotally mounted on said base and cooperating with said film holding tables for simultaneously cutting film strips thereon when the tables are in normal position, means controlled by the position of said knife for sliding said movable table to and from abutting position with said stationary table, spring pressed film holding platens pivotally mounted adjacent said tables for holding film strips thereon, and suitable means for operating said switch to start and stop said motor when the film holding platen on the movable table is swung between its releasing and holding position relative to said movable table respectively.

2. A film splicing apparatus comprising a base, a spindle mounted on said base and for receiving the rolls of film to be spliced, a stationary film holding table and a film holding table slidable relative thereto mounted on said base in alignment with said spindle, a motor driven take-up reel mounted on said base in alignment with said film holding tables, a switch mounted on said base for controlling the operation of said motor driven take-up reel, a knife pivotally mounted on said base and cooperating with said film holding tables for simultaneously trimming the ends of the film strips thereon, suitable means operated by said knife for sliding said movable table relative to said stationary table, said tables being separated in one position for the cutting operation and abutting in the other position for the splicing operation, spring pressed film holding platens pivotally mounted adjacent said tables for alternately holding and releasing the film strips thereon, and suitable means whereby said switch for the motor driven take-up reel is alternately opened and closed as the film holding platen on said movable table is swung between its holding and releasing position relative to said movable film holding table.

3. A film splicing apparatus comprising a stationary table for holding one end of the film to be spliced, a movable table for holding the other end of the film to be spliced, said movable table being slidable relative to said stationary table between trimming and abutting positions therewith, a knife for simultaneously trimming the ends of the film on said film holding tables pivotally mounted on said base, and a suitable connection between the knife and said movable table whereby said movable table is moved to and from splicing and trimming positions relative to the stationary table upon movement of the knife.

4. A splicing apparatus comprising a base plate, a stationary member mounted thereon arranged to hold one end of the film to be spliced, a movable member arranged to hold the other end of the film to be spliced thereon, resilient means normally forcing said movable member away from said stationary member, a knife for simultaneously trimming the film strips when said members are in their normal position relative to one another, and a suitable connection between the knife and said movable member whereby said movable member is moved to and from splicing and trimming positions relative to the stationary member upon movement of the knife.

5. A film splicing apparatus comprising a stationary table for holding one end of the film thereon, a movable table arranged to hold the other end of the film thereon, said movable table adapted to slide to and from abutting position with reference to said stationary table but normally spring pressed therefrom, a knife pivotally mounted on said base for simultaneously trimming the ends of the film on said tables, and connecting means between said knife and said movable table whereby the movable table is slid to and from abutting and cutting position depending upon the position of said knife.

6. In a splicing apparatus, the combination with a base, a stationary member mounted on said base, a movable member mounted on said base and adapted to move to and from trimming and abutting positions relative to said stationary member, a film cutting member rotatably mounted on said base and movable from an intermediate position to a cutting position and from said intermediate position to a splicing position, of a connection between said cutting member and said movable member whereby the movable member is adapted to be moved to trimming position relative to said stationary member when the cutting member is in either its cutting or intermediate position and to an abutting position with the stationary table when said cutting member is rotated to its splicing position, said connection including, an actuating arm for abutting said cutting member, a resilient means for operating said arm to return said cutting member from cutting position to said intermediate position and a second actuating arm also operated by said resilient means to return said cutting member from splicing position to said intermediate position.

7. In a splicing apparatus, the combination with a base, a stationary member mounted on said base, a movable member mounted on said base and adapted to move to and from trimming and abutting positions relative to said stationary member, a film cutting member rotatably mounted on said base and movable from an intermediate position to a cutting position and from said intermediate position to a splicing position, of a connection between said cutting member and said movable member whereby the movable member is adapted to be moved to trimming position relative to said stationary member when the cutting member is in either its cutting or intermediate position and to an abutting position with the stationary table when said cutting member is rotated to its splicing position, said connection including, an actuating arm for abutting said cutting member, a resilient means for operating said actuating arm to return said cutting member from cutting position to said intermediate position, and a stop member on said base for engaging said actuating arm upon return of said cutting member from cutting position to said intermediate position and selectively discontinuing the action of said resilient means on said arm.

8. In a splicing apparatus, the combination with a base, a stationary member mounted on said base, a movable member mounted on said base and adapted to move to and from trimming and abutting positions relative to said stationary member, a film cutting member rotatably mounted on said base and movable from an intermediate position to a cutting position and from said intermediate position to a splicing position, of a connection between said cutting member and said movable member whereby the movable member is adapted to be moved to trimming position relative to said stationary member when the cutting member is in either its cutting or intermediate position and to an abutting position with the stationary table when said cutting member is rotated to its splicing position, said connection including, an actuating arm for abutting said cutting member, a resilient means for operating said actuating arm to return said cutting member from cutting position to said intermediate position, a second actuating arm also operated by said resilient means to return said cutting member from splicing position to said intermediate position, and a catch member on said base for releasably holding said cutting means in the splicing position against said resilient means.

9. In a splicing apparatus, the combination with a base, a stationary member mounted on said base, a movable member mounted on said base and adapted to move to and from trimming and abutting positions relative to said stationary member, a film cutting member rotatably mounted on said base and movable from an intermediate position to a cutting position and from said intermediate position to a splicing position, of a connection between said cutting member and said movable member whereby the movable member is adapted to be moved to trimming position relative to said stationary member when the cutting member is in either its cutting or intermediate position and to an abutting position with the stationary table when said cutting member is rotated to its splicing position, said connection including, an actuating arm for abutting said cutting member, a resilient means for operating said arm to return said cutting member from cutting position to said intermediate position, a stop member on said base for engaging said actuating arm upon return of said cutting member from cutting position to said intermediate position and selectively discontinuing the action of said resilient means on said arm, a second actuating arm also operated by said resilient means to return said cutting member from splicing position to said intermediate position, and a second stop member mounted on said base for engaging said second actuating arm upon return of said cutting member from splicing position to said intermediate position and selectively discontinuing the action of said resilient means on said second arm.

10. A splicing apparatus comprising a base, a stationary film table arranged to hold one end of the film to be spliced thereon, a movable table adapted to hold the other end of the film to be spliced, said movable table capable of sliding movement to and from abutting position with the stationary table and normally spring pressed therefrom, a shaft rotatably mounted on said base, a knife rotatably mounted on said shaft for simultaneously trimming the ends of the film on said film holding tables, a spring pressed actuating arm rotatably mounted on said shaft said arm contacting the forward face of said knife, a projection on said arm, a stop member on said base adapted to be engaged by the projection on said arm, a second spring pressed actuating arm pinned to said shaft and contacting the rearward face of said knife so that a rearward movement of said knife causes a rotation of said shaft, a projection on said second arm, a second stop on said base adapted to be engaged by the projection on said second arm, a gear segment fixed to one end of said shaft, a turning post rotatably mounted on said base, a bar member connecting said turning post with said movable table, a gear member mounted atop the turning post and engaging said gear segment so that the rotation of said shaft causes a sliding of said table against its normal spring pressing means and vice versa, a catch member mounted on said base, and a spring pressed hook member pivotably mounted on said knife for releasably engaging said catch member and holding the knife in a rearward position wherein the movable film holding table is held in abutting position relative said stationary table against said normal spring pressing means.

11. A splicing apparatus comprising a base, a pair of film holding tables, one of said tables being stationary while the other is slidable to and from abutting position therewith and normally spring pressed therefrom, a shaft rotatably mounted on said base, a knife rotatably mounted on said shaft for trimming the film, an actuating arm rotatably mounted on said shaft and engaging one side of said knife, a projection on said arm, a stop on said base, said projection adapted to engage said stop, a second actuating arm pinned to said shaft and engaging the other side of said knife so that as the knife is rotated rearwardly of the vertical position it rotates said shaft, a second stop on said base, a projection on said second arm for engaging said second stop, spring pressing means between the two actuating arms normally forcing the knife to its raised position, a gear segment mounted on the end of said shaft, a turning post mounted on said base, a gear member mounted atop said turning post and engaging said gear segment, and a bar member fixed to said turning post and said movable table so that the table is slid to abutting position against its spring pressing means as the knife is rotated rearwardly of its vertical position.

12. A film splicing apparatus comprising a base, a spindle for receiving the rolls of film to be spliced mounted on said base, a stationary film holding table and a movable film holding table mounted on said base in alignment with said spindle said movable table slidable relative to said stationary table for abutment therewith but normally spring pressed therefrom, a motor driven take-up reel mounted on said base in alignment with said film holding table, a switch mounted on said base for controlling the operation of said motor driven take-up reel, a knife rotatably mounted on said base and cooperating with said film holding tables in their normal position for simultaneously trimming the ends of the film strips thereon, suitable means operated by said knife for sliding said movable table against its spring pressing means for abutting the trimmed ends of the film strips thereon, spring pressed platens pivotally mounted adjacent said film holding tables for releasably holding the film strips thereon, and suitable means on said switch cooperating with the mounting means for one of said platens, said cooperation causing the closing of said switch when said platen is raised and the opening of said switch when said platen is lowered.

13. A film splicing apparatus comprising a base plate, a stationary member mounted on said base plate, a movable member slidably mounted on said base plate, and spring pressed away from said stationary member, means on said stationary member for holding one end of the film, means on the movable member for holding the other end of the film, a knife pivotally mounted on the base plate, movable between the stationary and movable member, arranged to cut the ends of the film, connecting means between said knife and said movable member whereby said movable member is slid to abutting position with respect to said stationary member when the knife is moved rearwardly of its vertical position, a take-up reel mounted on said base plate for receiving the spliced film, a motor for driving said take-up reel, a switch for controlling said motor, and means whereby said switch is closed to start the motor when the film holding means on the movable member is raised to release the film thereon and opened to stop the motor when the film holding means is in holding position.

14. A film splicing apparatus comprising a base plate, a stationary member mounted thereon arranged to hold one end of the film to be spliced, a movable member slidably mounted on said base plate arranged to hold the other end of the film to be spliced, spring pressing means normally forcing said movable member away from said stationary member, a knife pivotally mounted on said base plate and adapted to swing forwardly of its vertical position passing between the stationary and movable members to trim the film thereon, said knife capable of a rearward movement with respect to its vertical position whereby it engages suitable means on said movable member for causing the sliding of said movable member to an abutting position with respect to said stationary member, a catch mounted on said base plate, and a spring pressed hook member pivotally mounted on said knife for releasably engaging said catch when said knife is in the position rearward of its vertical position.

15. A film splicing apparatus comprising a base, a stationary film holding table arranged to receive a film strip to be spliced, a slidable film holding table for receiving the other end of the film strip to be spliced and adapted to slide to and from abutting position with said film holding table, a knife rotatably mounted on said base for simultaneously trimming the ends of the film strips mounted on said tables, spring pressed platens for releasably holding said film strips on said film holding tables, a take-up reel mounted on said base in alignment with said film holding tables for receiving the strip of spliced film, a motor mounted on said base for driving said take-up reel, a switch mounted on said base for controlling said motor, and cooperating means on said switch and one of said film holding platens whereby the motor for said take-up reel is started when the film holding platen is raised and stopped when said film holding platen is lowered.

16. In a splicing apparatus, the combination with a base, a stationary film holding table mounted on said base, a movable film holding table mounted on said base and adapted to move to and from splicing and trimming positions relative to said stationary table, a film cutting member rotatably mounted on said base and movable from an intermediate position to a cutting position and from said intermediate position to a splicing position, of an actuating arm for abutting said cutting member, a resilient means for operating said arm to return said cutting member from cutting position to said intermediate position, a shaft rotatably mounted on said base adjacent said movable film holding table, a spring pressed platen pinned to and rotatably mounted with said shaft for releasably holding a film strip on said movable film holding table, a gear member fixed to and rotatably mounted with said shaft, a take-up reel mounted on said base in alignment with said film holding tables for receiving the spliced film therefrom, a motor for driving said take-up reel, a rotary switch mounted on said base for controlling said motor, an operating member for said switch extending therefrom, a gear segment pinned to said operating member, said gear segment engaging said gear member pinned to said shaft on which the platen is mounted so that the switch is closed when the film holding platen is lowered to film holding position.

17. A film splicing apparatus comprising a base, a pair of film holding tables arranged to receive the ends of the film to be spliced, a knife rotatably mounted on said base adapted to trim the two ends of the film simultaneously, a bar member mounted on said base adjacent one of said film holding tables, a spring pressed platen rotatably mounted on said bar member for releasably holding a film strip on said table, a shaft rotatably mounted on said base adjacent said second film holding table, a second spring pressed platen pinned to said shaft for releasably holding a film strip on said second film holding table and adapted to rotate said shaft when it is swung to and from its holding position, a gear member pinned to and rotatable with said shaft, a take-up reel for receiving the spliced film from the film holding tables, a motor for driving said take-up reel, a switch mounted on said base for operating said motor said switch operated by a member extending therefrom, a gear segment pinned to said switch operating member and engaging said gear member, said engagement causing a starting of the driving motor for the take-up reel when said film platen pinned to said shaft is raised to release the film and cause a stopping of the motor when said platen is lowered to hold the film on the film table.

CARTER J. HUGHEY.